United States Patent
Paczkowski et al.

(10) Patent No.: US 12,323,800 B2
(45) Date of Patent: Jun. 3, 2025

(54) NETWORK ACCESS BASED ON AI FILTERING

(71) Applicant: T-MOBILE INNOVATIONS LLC, Overland Park, KS (US)

(72) Inventors: Lyle Walter Paczkowski, Mission Hills, KS (US); William M. Parsel, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/644,463

(22) Filed: Apr. 24, 2024

(65) Prior Publication Data

US 2024/0276221 A1    Aug. 15, 2024

Related U.S. Application Data

(63) Continuation of application No. 17/501,731, filed on Oct. 14, 2021, now Pat. No. 11,997,490.

(51) Int. Cl.
*H04W 12/08* (2021.01)
*G06N 3/045* (2023.01)

(52) U.S. Cl.
CPC ............ *H04W 12/08* (2013.01); *G06N 3/045* (2023.01)

(58) Field of Classification Search
CPC .... H04W 12/08; H04W 12/122; G06N 3/045; G06N 3/08
See application file for complete search history.

(56) References Cited

U.S. PATENT DOCUMENTS

| 9,578,664 | B1* | 2/2017 | Paczkowski | H04L 63/126 |
| 9,811,686 | B1* | 11/2017 | Marquardt | G06Q 30/04 |
| 9,819,679 | B1* | 11/2017 | Bertz | H04L 63/0435 |
| 10,341,390 | B2* | 7/2019 | Dayan | H04W 12/30 |
| 11,049,039 | B2* | 6/2021 | Zimmer | G06N 5/04 |
| 2015/0142986 | A1* | 5/2015 | Reznik | H04L 69/24 709/228 |
| 2018/0096260 | A1* | 4/2018 | Zimmer | G06N 5/025 |
| 2019/0068647 | A1* | 2/2019 | Dayan | H04W 12/06 |
| 2021/0235266 | A1* | 7/2021 | Starsinic | H04W 8/183 |

* cited by examiner

*Primary Examiner* — J. Brant Murphy
(74) *Attorney, Agent, or Firm* — SHOOK, HARDY & BACON L.L.P.

(57) ABSTRACT

Embodiments of the present disclosure are directed to systems and methods for artificial intelligence-based filtering of user devices on a wireless network. Upon a request from a user device to access a requested network service, a trustlet executed in a trusted execution environment of the user device is activated. The trustlet provides data associated with the user device. The data is used to distinguish normal from anomalous device behavior. Analysis of the data can be facilitated by an artificial intelligence module. Based on the analysis, the requested network service may be selectively authorized or prohibited. Additionally, the trustlet can be activated while a network service is being utilized by a user device to detect anomalous and potentially deceptive activity.

20 Claims, 6 Drawing Sheets

NETWORK ACCESS BASED ON AI FILTERING

CROSS-REFERENCE TO RELATED APPLICATIONS

This application claims the benefit of priority to U.S. application Ser. No. 17/501,731, titled "Network Access Based On AI Filtering," filed Oct. 14, 2021, which is hereby expressly incorporated by reference in its entirety.

TECHNICAL FIELD

Aspects hereof relate to devices, systems, and methods for dynamically classifying mobile or network processors based upon biometric or programmatic parameters using assimilated intelligence filtering and trusted environments.

SUMMARY

The present disclosure is directed, in part to performing artificial intelligence-based device filtering for a wireless network, substantially as shown and/or described in connection with at least one of the Figures, and as set forth more completely in the claims.

With the ever-growing sophistication of digital editing technology and wireless network technology, wireless networks are becoming more vulnerable to, and inherently vectors of, attack or exploitation. For example, a malicious actor may attempt to create a virtualized device and pass the virtual device off as corresponding to an autonomous vehicle, a bank, a medical facility, a governmental agency, and so forth. Similarly, real-time audio or video editing could be used to emulate a voice of a trusted friend, partner, parent, government official, or another trusted individual.

Traditionally, network access for a device was at least partially controlled by completing identifier checks, in order to determine if a particular device was permitted to access the network (e.g., on a whitelist), was restricted (e.g., on a greylist), or prohibited (e.g., on a blacklist). Subscriber identification modules (also referred to as subscriber identity modules or SIM) typically facilitated the identifier checks, at least in part. Though narrowly tailored access controls may have been desirable in traditional wireless networks, dynamic and adaptive access control may be better suited to other situations.

According to various aspects described herein, a devices' network access is based on an artificial intelligence filter's analysis of data derived from the devices' silicone (e.g., processor, microcontroller, sensors, and so forth), data transmissions, biometric data, or any combination thereof. The filters may be stored in a distributed ledger to, at least partially, ensure that the filters are trustworthy. The data may be collected, generated, or otherwise derived using a trustlet executed within a trusted execution environment of a device. In some aspects, a trustlet is activated in response to a device's request for a network service (e.g., voice, data, or messaging). A carrier's home network (e.g., the primary network the carrier operates) may expose a network slice (e.g., a virtualized network) to the device to facilitate dedicated communications with the device's trustlet. Based on the analysis of the data, the network can execute an access management operation. For example, the network may expose access to the requested network service, limit or restrict access to the network service, terminate a currently accessed network service, continue monitoring the device's use of the network service, transfer the device to a different network slice, communicate a warning to a remote service or recipient device, or any other access management operation.

The aspects described herein include methods, systems, computer readable media, and devices. For example, according to some aspects described herein, a network detects a network service. In response to the request, a network component activates an executable code stored by the UE that corresponds to the request. The data provided by the executable code is provided as input to an artificial intelligence (AI) module. The AI module may be an autoencoder in an aspect. At least partially based on output of the AI module and the data, a score can be determined for the UE. Based on the score, an access management action for the UE can be executed.

For another example, a network component triggers a trustlet operating within the trusted execution environment of a remote device to communicate a set of data. The set of data is analyzed using an AI module to generate a score. The score is compared to a predetermined threshold. Based on the comparison, an access management action is executed for the remote device corresponding to the network service.

For another example, one or more components of a network system receive, via a network slice, a request for a network service from a user device wherein the user device is associated with a device specific identifier. In response to the request and based on the device specific identifier, the system identifies an AI filter stored in a distributed ledger. An AI module is configured using the AI filter and a second network slice is exposed to the user device. The system communicates a signal to the user device that activates one or more trustlets executed in a trusted execution environment of the device. The configured AI module is used to generate a reduced dimensionality representation of the data collected by the trustlets. A score is generated by comparing the data to the reduced dimensionality representation of the data. In response to the score exceeding a threshold, executing an access management action that restricts access to the requested network service.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Traditional network operators maintain, and may share, lists of specific user devices that have reduced access to their networks, whether because they are fraudulent, spammers, security threats, or the like. However, developments in wireless network technology may significantly hinder the viability of traditional network access controls. For example, artificial intelligence, device virtualization, electronic SIM, real-time or near real-time data editing, and the like may be used by malicious actors to emulate or spoof a device that has a desired level of access. In other words, a malicious actor may use newly developed technology to subvert the traditional techniques that wireless communication networks rely on to establish digital identity and digital trust.

Accordingly, the aspects described herein provide for, among other things, methods, systems, or computer-program products that facilitate silicone, data transmissions, user biometric data, and combinations thereof based digital identity authentication. Accordingly, some embodiments may take the form of a hardware embodiment, a software embodiment, or an embodiment combining software and hardware. An embodiment takes the form of a computer-program product that includes computer-useable instructions embodied on one or more computer-readable media. Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

As used herein, digital identity refers to a data-based representation of a person, device, or a combination of both. Said another way, digital identity can refer to a "finger print" created from data that identifies a particular device or class of devices, a particular person or group of people, or a combination of a device and a person.

Digital trust refers to a data driven determination that a particular digital identity is authentic. In other words, digital trust is established if, and only if, a trusted authority validates that an entity providing a particular digital identity is authentic.

Generally, aspects described herein incorporate a remote device's (also referred to as user equipment or UE) trusted execution environment, a wireless communication network's network core, and an immutable distributed ledger network. For example, and turning to FIG. 1, some aspects described herein can be facilitated by some or all of the components of network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Figure 1:
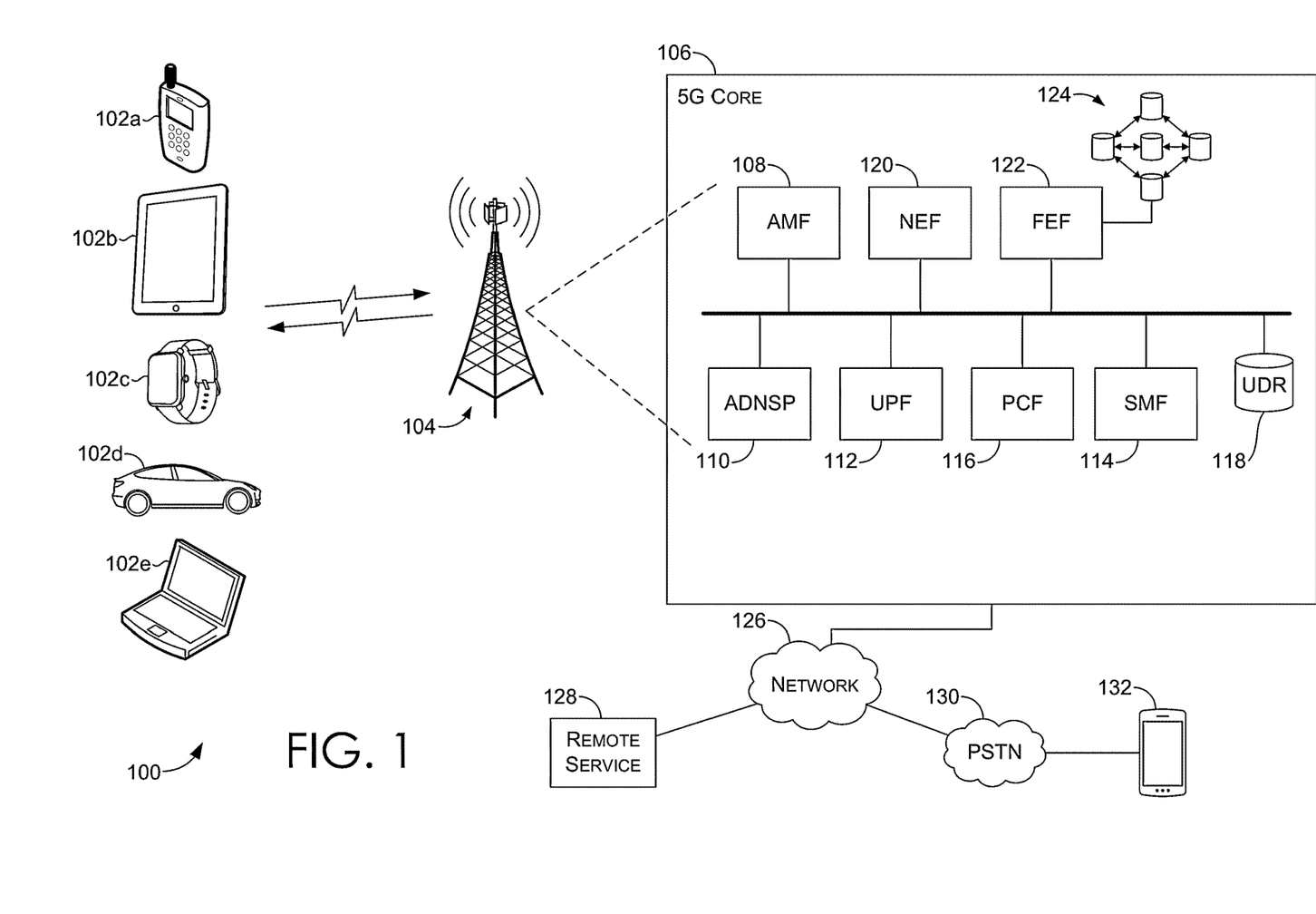
FIG. 1 depicts a diagram of an exemplary network environment in which implementations of the present disclosure may be employed.

Network environment 100 represents a high level and simplified view of relevant portions of a modern wireless telecommunication network. At a high level, the network environment 100 generally comprises one or more first UEs (e.g., UE 102*a*-102*e*, collectively referred to as UE 102), a radio access network (RAN) 104 a network core 106, a distributed ledger network (DLN) 124, network 126, and remote service 128, though in some implementations, it may not be necessary for certain features to be present. For example, in some aspects, the network environment 100 may not comprise a distinct network core 106, but rather may implement one or more features of the network core 106 within other portions of the network or may not implement them at all, depending on various carrier preferences. The network environment 100 is generally configured for wirelessly connecting the first UE 102 to data or services that may be accessible on one or more application servers or other functions, nodes, or servers (such as remote service 128). Additionally, the network environment 100 is configured for wirelessly connecting the first UE 102 to other UEs, such as the second UE 132, via other telecommunication networks such as a publicly-switched telecommunication network (PSTN) 130 or network 126.

Figure 6:
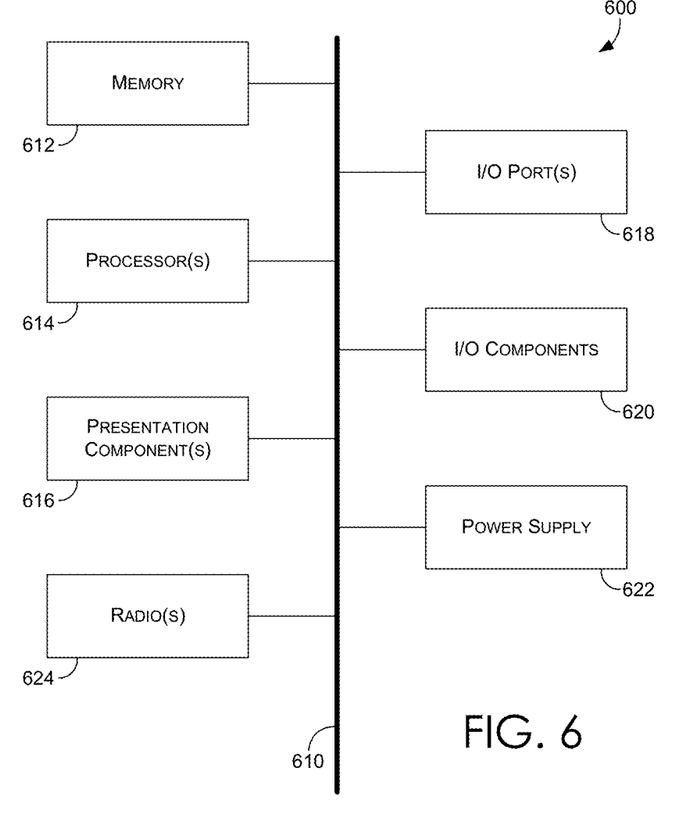
FIG. 6 illustrates an exemplary computing device for use with the present disclosure.

As depicted, a UE (e.g., UE 102 or UE 132) may take any number of forms, including a tablet (e.g., UE 102*b*), phone (e.g., UE 102*a*), wearable device (e.g., UE 102*c*), a vehicle (e.g., UE 102*d*), laptop (e.g., UE 102*e*), or any other device discussed with respect to FIG. 6. UE 102 is a device that is capable of unidirectional or bidirectional communication with a wireless access point 104 using radio frequency waves. In other words, UE 102 generally facilitates access to a wireless communications network via wireless access point 104 (also referred to as a radio access network (RAN)).

In some aspects, UE 102 or UE 132 may specifically not be a conventional telecommunications device (i.e., device that is capable of placing and receiving voice calls), but may instead take the form of a device that only utilizes wireless network resources in order to transmit or receive data; such devices may include IoT devices (e.g., smart appliances, thermostats, locks, smart speakers, lighting devices, smart receptacles, and the like), remote sensors (e.g., traffic sensors, weather sensors, wireless beacons, and the like).

The RAN 104 is generally configured to transmit and receive one or more signals 130 between a base station and UE 102. The one or more signals 130 comprise one or more uplink signals for which the RAN 104 is configured to receive from the first UE 102. In response to receiving certain requests from the first UE 102, the RAN 104 may communicate with the network core 106. For example, in order for the first UE 102 to connect to a desired network service (e.g., PSTN call, voice over LTE (VoLTE) call, voice over new radio (VoNR), data, or the like), the first UE 102 may communicate an attach request to the RAN 104, which may, in response may communicate a registration request to the network core 106. The RAN 104 may take the form of a home network (i.e., a RAN belonging to or affiliated with the carrier associated with the first UE 102) or a visiting/roaming network (i.e., a RAN belonging to or operated by an entity other than the carrier associated with the first UE 102, but which, in certain conditions, may provide extended wireless access to the first UE 102 beyond the reaches of the home network). Further, though the RAN 104 is illustrated as a single wireless access point, the RAN 104 may comprise a multi-hop wireless system, in itself; for example, the RAN 104 may comprise a small cell or relay, to which the first UE 102 is connected and a backhaul access point (e.g., an e- or gNodeB).

Relevant to the present disclosure, one or more modules of the network core 106 may work cooperatively to determine whether the first UE 102 is authorized to access the desired network service. As used herein, the terms "function" and "module" are used to describe a computer processing component and/or one or more computer executable services being executed on one or more computer processing components. For example, the network core 106 may comprise modules or functions that include any one or more of a core access and mobility management function (AMF) 108, an access network discovery and selection policy (ADNSP) 110, a user plane function (UPF) 112, a session management function (SMF) 114, a policy control function (PCF) 116, and a network exposure function (NEF) 120. AMF 108 facilitates mobility management, registration management, and connection management for 3GPP devices such as UE 102. ADNSP 110 facilitates mobility management, registration management, and connection management for non-3GPP devices. SMF module 114 facilitates initial creation of PDU sessions using session establishment procedures. The PCF 116 maintains and applies policy control decisions and subscription information. Additionally, in some aspects, the PCF 116 maintains quality of service (QoS) policy rules. For example, the QoS rules stored in a unified data repository can identify a set of access permissions, resource allocations, or any other QoS policy established by an operator.

Some aspects of network environment 100 comprises a unified data repository (UDR) 118 for storing information relating to access control. The UDR 118 is generally configured to store information relating to subscriber information and access and may be accessible by multiple different NFs in order to perform desirable functions. For example, the UDR 118 may be accessed by the AMF in order to determine subscriber information, accessed by a PCF 116 to obtain policy related data, accessed by a NEF 120 to obtain data that is permitted for exposure to third party applications. In addition to being accessible by one or more NFs, such as those described herein, the one or more NFs may also write information to the UDR 118. Similar to the AMF 108, the network environment 100 illustrates the UDR 118 according to a version of the 3GPP 5G architecture; in other network architectures, it is expressly conceived that the UDR 118 may take any desirable form of a data repository capable of being written to and accessed by one or more NFs or other functions or modules (e.g., a call session control function). Though not illustrated so as to focus on the novel aspects of the present disclosure, the network environment may comprise a unified data management module (UDM) which may facilitate communication between an NF, function, or module and the UDR 118. Although depicted as a unified data management module, UDR 118 can be a plurality of NF specific data management modules.

The network environment 100 may also comprise a user plane function (UPF) 112. The UPF 112 is generally configured to facilitate user plane operation relating to packet routing and forwarding, interconnection to a data network, policy enforcement, and data buffering, among others. In aspects where one or more portions of the network environment 100 are not structured according to the 3GPP 5G architecture, the UPF 112 may take other forms, such as a serving/packet gateway (S/PGW).

NEF 120 generally controls service exposure for UEs attempting to connect or connected to the communication network. As such, NEF 120 facilitates secure exposure of services and capabilities of the communication network. The services available to a UE can vary based on implementation and carrier preference. However, illustrative services include voice services, messaging service, and data services. Similarly, illustrative network capabilities can include access to private network slices, such as those facilitated by virtualized network functions (VNF) or network function virtualization (NFV). For example, the NEF 120 can enable a UE to access a network slice established by a corporation to facilitate communication between employees. Similarly, the NEF 120 can enable a UE to access a network slice dedicated to facilitating services related to mobile games, file sharing, software updates, firmware updates, any other carrier approved purpose, or any combination thereof. For example, the NEF 120 can expose a network slice dedicated to facilitating data transfers related to autonomous vehicles or dedicated to hosting mobile game tournaments. Additionally, NEF 120 facilitates access to network slices of network core to applications, trustlets, or both. In some embodiments, NEF 120 allows access to a first network slice for one or more UE applications and a second network slice to the trustlet(s) associated with the UE. For example, in response to a UE's request to access a network service (e.g., a voice service, message service, data service) via a primary network slice, NEF 120 can facilitate a trustlet executed by the UE that provides data to FEF 122 access to a second network slice while preventing access to the second network slice to other processes executed by the UE.

Notably, the preceding nomenclature is used with respect to the 3GPP 5G architecture; in other aspects, each of the preceding functions and/or modules may take different forms, including consolidated or distributed forms that perform the same general operations. For example, the AMF 108 in the 3GPP 5G architecture is configured for various functions relating to security and access management and authorization, including registration management, connection management, paging, and mobility management; in other forms, such as a 4G architecture, the AMF 108 of FIG. 1 may take the form of a mobility management entity (MME). The network core 106 may be generally said to authorize rights to and facilitate access to an application server/service such as remote service 128, requested by the UE 102.

The network environment 100 additionally includes an AI filtering engine function (FEF) 120. Generally, FEF 122 analyzes data transmitted by a UE to facilitate identification and authentication of a UE's digital identity. To facilitate the analysis of the FEF 122 maintains one or more artificial intelligence modules. The one or more artificial intelligence modules are configured to identify anomalous activity within the data transmitted through the wireless network. For example, in some aspects the FEF 122 maintains an autoencoder neural network. In such an aspect, the input layer of the autoencoder can comprise data generated by one or more trustlets (e.g., Policy Governing Trustlet 206, Interrogation Trustlet 208, AI Filter Trustlet 210 as described in relation to FIG. 2) executed within a trusted execution environment of a UE (e.g., UE 102a-102e). The data provided in the input layer is encoded into a reduced dimensionality representation of that data. The FEF 122 can compare the reduced dimensionality representation of the data to the original data generated by the one or more trustlets in order to identify anomalous patterns in the data. In some embodiments, anomalies can be identified based on the reconstruction error detected between the original data and the reduced dimensionality representation of the data. For example, FEF 122 may determine the reconstruction error by finding the mean square error (MSE) between the reconstructed data and the original data. For another example, FEF 122 may calculate a distance between a vector generated from the original data and a vector generated from the reconstructed data. For another example, FEF 112 may compare waveform transforms of the original data and reconstructed data. In some embodiments, reconstruction error may be determined by any suitable data analysis algorithm.

Figure 2:
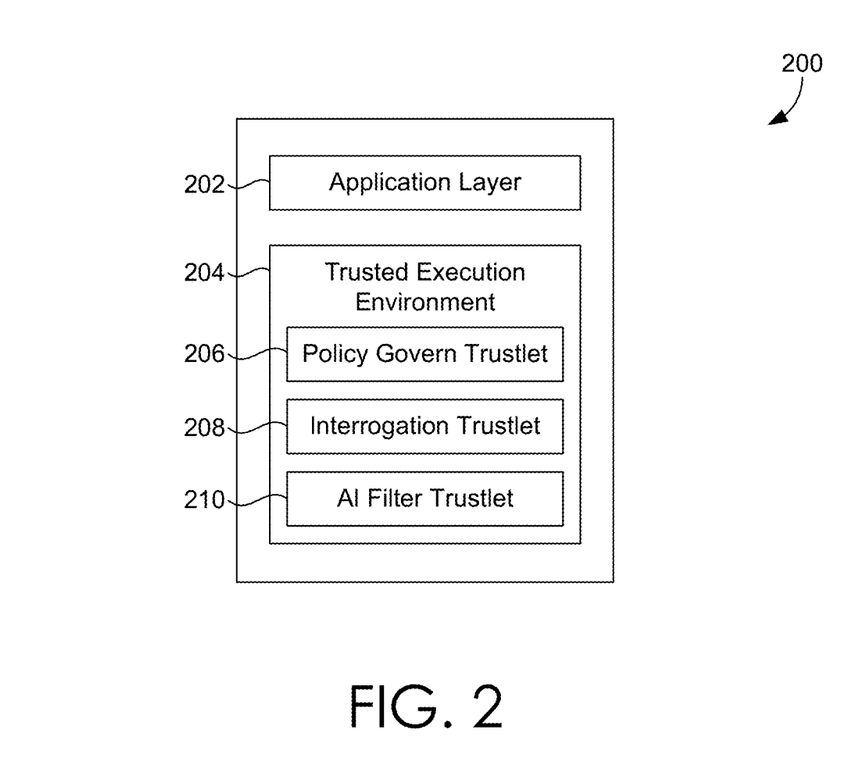
FIG. 2 depicts an illustrative device including one or more trustlets, in accordance with aspects hereof.

Similarly, interrogation trustlet 208 corresponds to an illustrative example of computer readable code that is activated in response to a command from the communication network. An interrogation trustlet can be activated by a command that is generated in response to a determination that UE 200 is an unknown device or that the UE provided anomalous data for a requested network service. In response to activation, an interrogation trustlet may activate other trustlets (e.g., policy governing trustlet 206, AI filter trustlet 210, or any other trustlet), access additional data, or perform any other trustlet operation. The interrogation trustlet may communicate the accessed data to a network. For example, interrogation trustlet 208 is activated in response to a command that the network has requested data from one or more trustlets executed in the trusted execution environment.

In some aspects, the reconstruction error is calculated as a score. For example, the reconstruction error may be normalized to a quantitative value (e.g., a score). Reconstruction error scores greater than a predetermined threshold (i.e., indicating that the reduced dimensionality representation of the data has an anomalous pattern of data) are reported to the network core 106 as untrustworthy. In other words, digital trust cannot be established for a UE that generates a score greater than the predetermined threshold. Reconstruction error scores less than a predetermined threshold (i.e., indicating that the reduced dimensionality representation of the data has minimal or tolerable anomalous patterns of data, or normal patterns of data) are reported to the network core 106 as trustworthy. In other words, digital trust is, at least temporarily, established for a UE that generates a score less than or equal to the predetermined threshold.

The one or more artificial intelligence modules can be trained via unsupervised, supervised, or semi-supervised training data. The training data can vary based on carrier preference. For example, a first artificial intelligence module can be trained with data generated by known (i.e., trusted) UEs. For example, one or more trustlets can be executed by a plurality of UE's (e.g., UE 102a, UE 102b, UE 102c, UE 102d, UE 102e, and any other UE) using each of potential microcontroller and microprocessor combination supported by the UE producer (e.g., Apple®, Microsoft®, Google®, Tesla®, AMD®, Intel®, and so forth). Applications, network services, and any other operations of the UE can be executed by the UE. The data captured or generated by the trustlets is provided to an artificial intelligence module (e.g., an autoencoder, deep neural network, multilayer perceptron, convolutional neural network, any combination thereof, or the like). In an aspect, the trustlet data is provided as training data for an autoencoder. Accordingly, the autoencoder is trained to encode the trustlet data into a reduced dimensionality representation that can be decoded to recreate the trustlet data. Said another way, an artificial intelligence module can be trained to recreate "normal" UE activity by exposing the artificial intelligence module to trustlet data generated by known devices. Relevantly, the trained model will have reconstruction errors during decoding of trustlet data including anomalous UE activity. In an aspect, the configuration of a trained autoencoder is stored in a distributed ledger network (e.g., distributed ledger network 124) as an AI Filter for dynamic implementation by FEF 122 during deployment.

The network environment 100 additionally includes at least one node of a distributed ledger network (DLN) 124. Generally, DLN 124 includes a plurality of nodes, each of which maintain an immutable ledger of data. A DLN node can use a cryptographic hash function (e.g., SHA256, MD5, Skein, BLAKE, or AES) to encode a fingerprint of the data stored in the DLN. In some aspects, the DLN node blocks a set of data including the cryptographic hash of the previously stored block, at least partially, to ensure that entries in the ledger cannot be retroactively changed without irreconcilably changing the hashes of subsequent entries in the ledger. For example, DLN 124 can comprise a network of hashgraph nodes, blockchain nodes, or similar distributed ledger nodes. In a particular aspect, network environment 100 includes at least one hyperledger node. In some aspects, DLN 124 is a private distributed ledger network. The DLN 124 may include a consensus module that ensures the leger includes records that are verified by a minimum number of nodes, a majority of nodes, or a specifically identified node. The distributed ledger maintained by DLN 124 can store trustlet data, AI filters, or any other data.

Network 126 generally facilitates communication between the UEs 102, remote service 128, public switched telephone network (PSTN) 130, and remote UE 132. As such, network 126 can include access points, routers, switches, or other commonly understood network components that provide wired or wireless network connectivity. In other words, network 126 may include multiple networks, or a network of networks, but is depicted in a simple form so as not to obscure aspects of the present disclosure. By way of example, network 126 can include one or more wide area networks (WANs), one or more local area networks (LANs), one or more public networks, such as the Internet, one or more private networks, one or more telecommunications networks, or any combination thereof. Where network 126 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 126 is not described in significant detail herein.

Remote service 128 generally facilitates hosting services, data, or both for an application executed by UE 102. For example, a remote service can be application server hosting a multiplayer game, a streaming video service, a picture or video distribution, outfacing services (e.g., banking, medical, social, and similar services), or storage service. In other words, an aspect of remote service 128 includes a web server for hosting a website accessible by any of the UEs 102. Additionally or alternatively, an aspect of remote service 128 includes a data server supporting an application executed by a UE. The hosted website or data server can support any type of website or application, including those that facilitate gaming, media upload, download, streaming, distribution, or storage. Additionally, some aspects of remote service 128 monitors QoS parameters associated with the communication link between UE 102 and remote service 128. In some aspects, a QoS parameter comprises a measure of latency, a measure of data throughput, or both. Additionally, some aspects of remote service 128 include a record of desired QoS parameters. For example, a desired QoS parameter can be a maximum latency, a minimum data throughput, or both.

Turning to FIG. 2, an illustrative example of a UE 200 is depicted in accordance with aspects described herein. Although some UE's (e.g., UE 102*a*-102*e* of FIG. 1) may include other systems, generally UE 200 includes an application layer 202 and a trusted execution environment (TEE) 204. The application layer 202 facilitates UE 200 operating system, executables (including applications). In other words, the application layer 202 provides the direct user interaction environment for the UE 200.

TEE 204 facilitates a secure area of the processor(s) of UE 200. In other words, TEE 204 provides an environment in the UE 200 with isolated execution and confidentiality features. Example TEEs include TrustZone, SGX, or similar. Generally, computer readable code executed in the TEE 204 can securely access data stored memory of the UE 200 that is otherwise inaccessible in the application layer 202. For example, computer readable code (e.g., trustlet) executed in TEE 204 can access biometric data, private and/or public keys, and similar data stored by the UE 200. Trustlets (e.g., trusted processes, secure processes, IUM processes, or the like) can be activated in response to various network or UE operations. For example, a trustlet can be activated by execution of an associated application in the application layer 202. For another example, a trustlet can be activated in response to a command generated by a network (e.g., network core 106 of FIG. 1) and communicated to the UE. The trustlet(s) activated may vary depending on the service requested. For example, a first trustlet may be activated in response to a voice service. A second trustlet may be activated in response to a messaging service. A third trustlet may be activated in response to a data service that facilitates a mobile game application. Similarly, the trustlet(s) activated may vary within a particular type of service. For example, a fourth trustlet may be activated in response to a data service request that facilitates a banking application.

Upon activation, a trustlet performs a set of predetermined operations. The operations can include, but are not limited to: accessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations or data from a device coupled to the UE (such as monitoring a wearable device wirelessly connected to the UE); access or monitor operations of other applications executed by the UE; writing data to the memory of UE; activate another trustlet; or any combination thereof.

As depicted, TEE 204 illustratively includes a policy governing trustlet 206, an interrogation trustlet 208, and an AI filter trustlet 210. Policy governing trustlet 206 corresponds to an illustrative example of computer readable code that is activated in response to execution of an application or operation. Upon activation, policy governing trustlet 206 may access a locally stored set of keys corresponding to the application and the UE's processor. Additionally, policy governing trustlet 206 may access a UE's unique identifier (e.g., an international mobile equipment identity (IMEI)). The policy governing trustlet 206 may communicate the accessed data to a communication network for analysis.

Similarly, interrogation trustlet 208 corresponds to an illustrative example of computer readable code that is activated in response to a command from the communication network. An interrogation trustlet can be activated by a command that is generated in response to a determination that UE 200 is an unknown device or that the UE provided anomalous data for a requested network service. In response to activation, an interrogation trustlet may activate other trustlets (e.g., policy governing trustlet 206, AI filter trustlet 210, or any other trustlet), access additional data, or perform any other trustlet operation. The interrogation trustlet may communicate the accessed data to a network. For example, interrogation trustlet 208 is activated in response to a command that the network has requested data from one or more truslets executed in the trusted execution environment.

AI filter trustlet 210 corresponds to an illustrative example of computer readable code that is activated in response to establishment of a network service. In response to activation, an AI filter trustlet monitors the UE while the communication channel facilitating the network service is active. The AI filter trustlet continuously, periodically, or intermittently samples a predetermined set of UE characteristics (e.g., chip state, processor load, sensor input, or the like). The predetermined set of UE characteristics can be customized based on the inputs of a corresponding AI filter for an artificial intelligence module of an FEF (e.g., FEF 122 of FIG. 1). The predetermined set of UE characteristics may also be customized based on the active service or combination of services. For example, AI filter trustlet 210 may be activated in response to establishment of a voice service. In such a case, the AI filter trustlet may sample audio input from a microphone, the output of an analog to digital converter, or any other UE characteristic. Similarly, the AI filter trustlet 210 may be activated in response to establishment of a data service or message service and sample the predetermined set of UE characteristics. The AI filter trustlet 210 may communicate the sampled data to a communication network for analysis.

Figure 3:
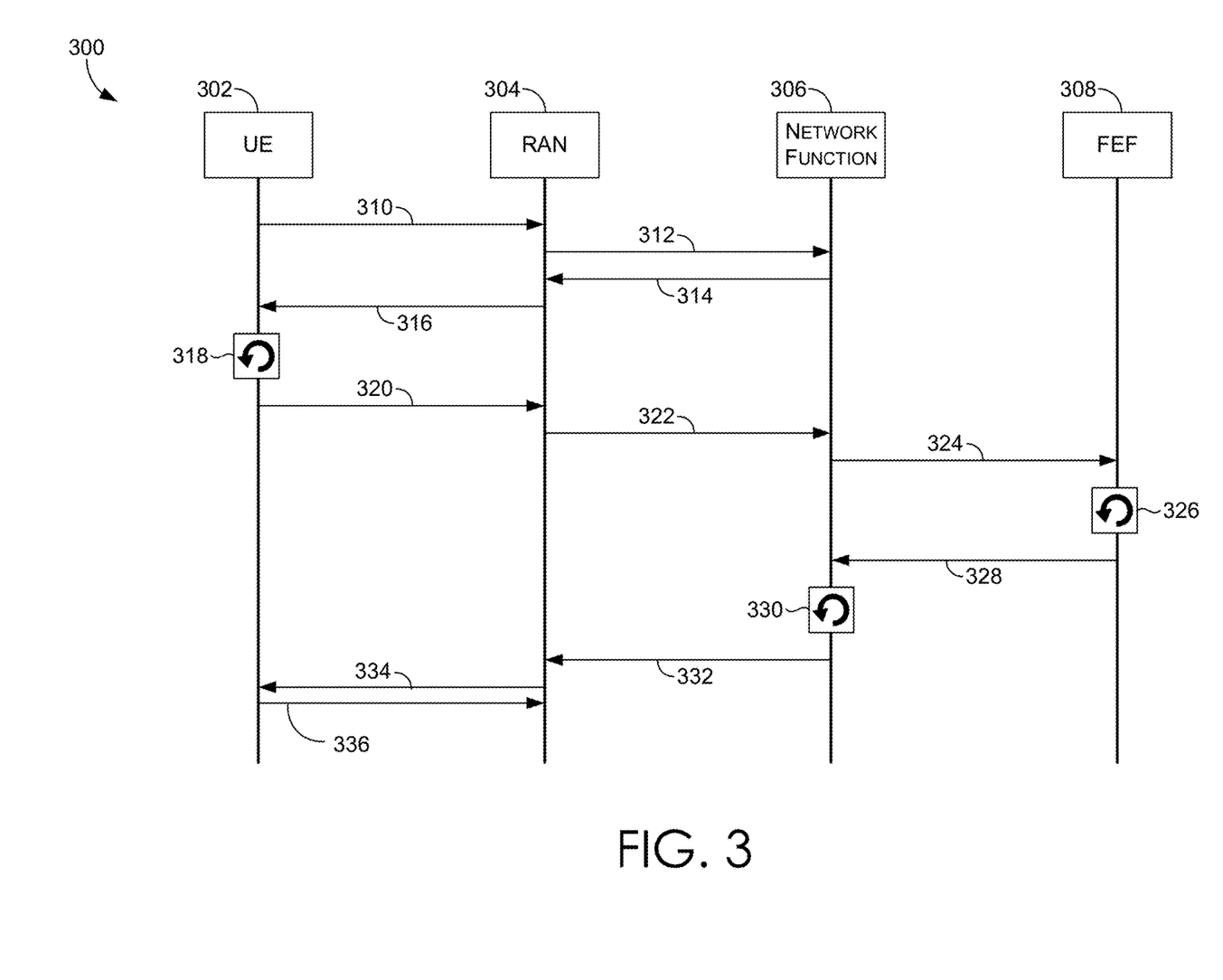
FIG. 3 depicts a flow diagram of a method for filtering malicious or rogue devices based data collected from one or more trustlets, in accordance with aspects hereof.

Turning to FIG. 3, an example flow diagram is provided in accordance with aspects described herein. Call flow 300 includes a UE 302 (e.g., UE 102 of FIG. 1), a RAN 304 (e.g. RAN 104 of FIG. 1), an network function (NF) 306 (e.g., AMF 108, ADNSP 110, UPF 112, NEF 120, or SMF 114 of FIG. 1), and an FEF 308 (e.g., FEF 122 of FIG. 1). However, call flow 300 illustratively depicts a non-exhaustive flow of the interactions that components described herein can have. It is expressly contemplated that carrier (e.g., entity providing the communication network) preferences and system architecture will affect the implementations of call flow 300. As such, some aspects described herein may have additional interactions, may have alternative sequencing, may omit some components, or may have alternative components.

Some aspects of call flow 300 begin with step 310, UE 302 communicates a first request to the RAN 304 to access a requested network service. At step 312, the RAN 304 relays the request to the NF 306. For example, UE 302 may request a voice call, messaging, or data via a remote service server. In aspects where the network service requested by the UE 302 is a voice call, the NF 306 may take the form of a CSCF; in aspects where the network service requested by the UE 302 is messaging, the NF 306 may take the form of a CSCF of an IPSMGW; in other aspects, such as where the network service requested by the UE 302 is data, the NF 306 may comprise an AMF.

At steps 314 and 316, the NF 306 requests identity information from the UE 302, via the RAN 304. For example, in a particular aspect, an NEF generates a request for identify information. In some aspects, the request includes a command to activate one or more trustlets executed in the TEE of UE 302. The trustlet(s) activated may vary depending on the service requested. For example, a first trustlet may be activated in response to a voice service. A second trustlet may be activated in response to a with a messaging services. Similarly, the trustlet(s) activated may vary within a particular type of service. For example, a request to access a remote service maintained by a server (e.g., remote service server 128 of FIG. 1) that provides access to financial information, such as via a banking app, can be configured to generate a request from the NEF that activates a set of trustlets.

At step 318, the UE 302 activates one or more trustlets in TEE based on the identity information request. The trustlet(s) access or generate a key pair and UE 302 responds with the identity information request with the key pair at step 320. In some aspects, a key pair includes an address and a value. The address can be a public or private key that corresponds to an entry in a distributed ledger. The value can be any computer readable value.

At step 322, the RAN 304 forwards the key pair to NF 306. At step 324, the NF 306 passes the key pair to FEF 308 for verification. At step 326, FEF 308 verifies the key pair by checking a copy of the distributed ledger maintained by a node of a DLT network (e.g., DLT network 124 of FIG. 1). For example, FEF 308 parses the key pair and searches the distributed ledger for the address specified by the public or private key. FEF 308 compares the value stored in the distributed ledger with the specified value from the key pair. In a situation where the distributed ledger value and the specified key pair value are exact matches, the FEF 308 generates a validation signal and transmits the validation signal to one or more network functions of NF 306. In this context, the validation signal is an indication that the identification information provided by UE 302 is an authentic and true key pair generated by a trusted network function. In other words, validation of the key pair may be an indication of digital trust can be established, at least temporarily, for the digital identity purported by the UE. In a situation where the distributed ledger value and the specified key pair value are not exact matches, the FEF 308 generates a suspicious activity signal and transmits the suspicious signal to one or more network functions of NF 306. In other words, failed validation of the key pair may be an indication of digital trust cannot be established for the digital identity purported by the UE.

At step 328, FEF 308 transmits a signal back to NF 306 based on the analysis of step 326. At step 330, NF 306 determines based on the signal received from FEF 308 a QoS policy to apply to the session facilitating the service requested by the UE 302 in step 310. For example, NF 306 selects a QoS policy associated with non-restricted access privileges where a validation signal is provided by FEF 308. The non-restricted access privileges can vary based on the carrier and the requested service. For example, non-restricted access privileges may provide access to all requested network services, may enable any available service preferences, and may enable access to a trusted network slice. In other words, validation of the key pair may be an indication of digital trust can be established, at least temporarily, for the digital identity purported by the UE.

In contrast, NF 306 selects a QoS policy associated with restricted access privileges where FEF 308 provides a suspicious activity signal. For a non-limiting example, restricted access privileges may a ban on all non-emergency network services, may limit bandwidth allocated to UE 302, or may transfer the UE 302 to a segregated network slice. Additionally, at step 330 NF 306 may execute any necessary access modifications or prohibitions to facilitate the application of the QoS policy. NF 306 responds to UE 302 via RAN 304 in steps 332 and 334. In some aspects, at step 336, the UE 302 may subsequently respond back to the NF 306, via the RAN 304, that registration is complete.

As such, call flow 300 facilitates detection of anomalous UE activity when a UE requests a service provided by a communication network. Anomalous activity is detected by analyzing data provided by trustlets executed in the TEE of the UE. In response to detecting anomalous activity, the network may limit or prevent access to network services.

Figure 4:
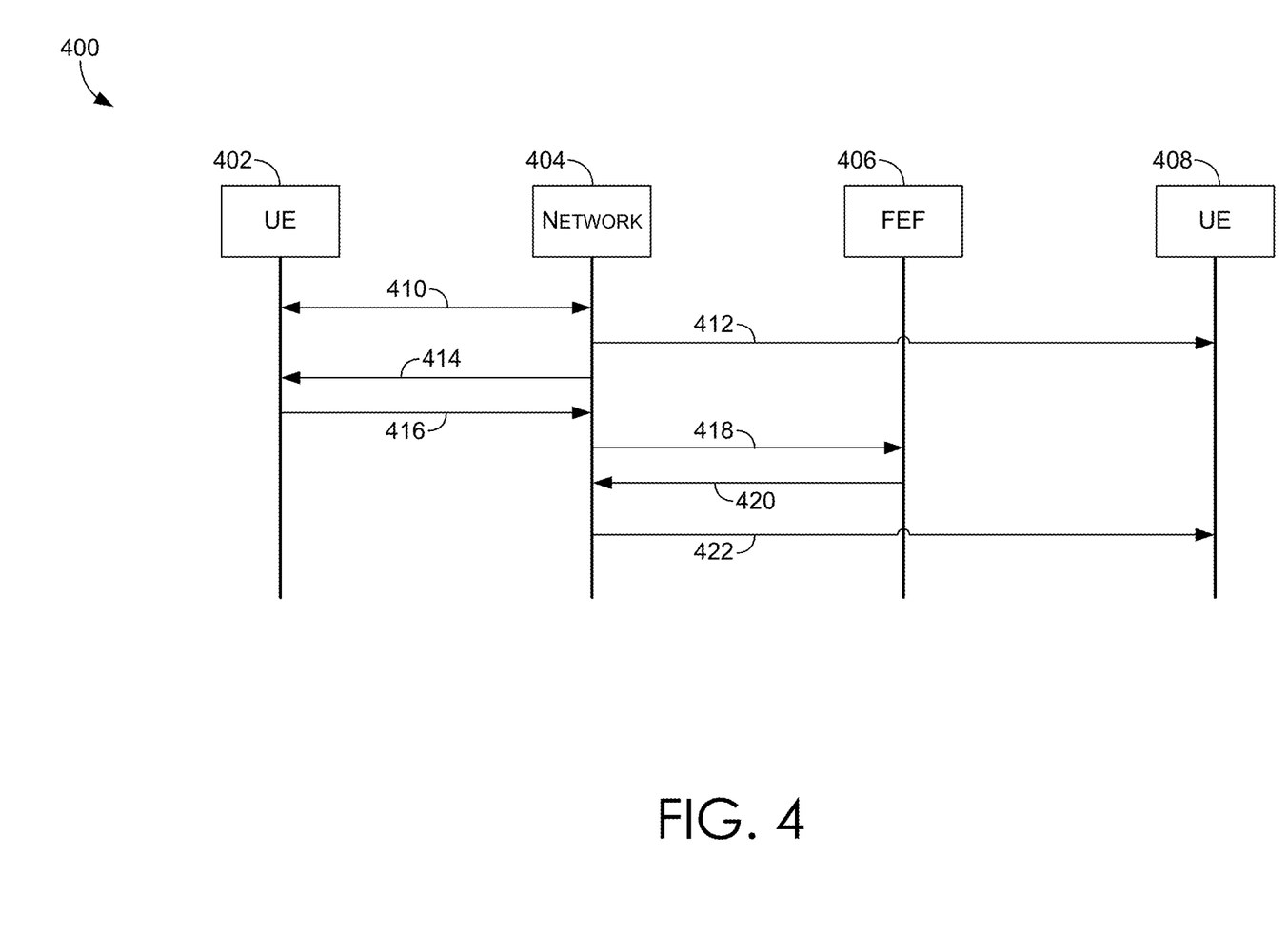
FIG. 4 depicts another flow diagram of a method for filtering malicious or rogue devices based data collected from one or more trustlets, in accordance with aspects hereof.

Turning to FIG. 4, another example flow diagram is provided in accordance with aspects described herein. Call flow 400 includes UE 402(e.g., UE 102 of FIG. 1), a network 404 (e.g., a RAN 104 and network core 106 of FIG. 1), an FEF 308 (e.g., FEF 122 of FIG. 1), and a UE 408. Call flow 400 illustratively depicts a non-exhaustive flow of the interactions that components described herein can have. It is expressly contemplated that carrier (e.g., entity providing the communication network) preferences and system architecture will impact the implementations of call flow 400. As such, some aspects described herein may have additional interactions, may have alternative sequencing, may omit some components, or may have alternative components. Although some steps are depicted as occurring in series, one skilled in the art will recognize that the described steps can occur in series or in parallel. For example, in some aspects, steps 414-422 occur in parallel with step 412.

Some aspects of call flow 400 begin with step 410, UE 402 and network 404 establish registration of a service. For example, the network service can be a voice, message, or data service between UE 402 and UE 408. At step 412, network 404 facilitates connecting UE 402 and UE 408 based on the established service. At step 414, a network function (e.g., a NEF function) of network 404 triggers a trustlet executed in the TEE of UE 402. In some aspects, NEF function can expose the trustlet to a hidden network slice to facilitate communication between the trustlet and network 404. At step 416, the trustlet executed in the TEE of UE 402 responds with a set of data. For example, the data can include processor performance data, biometric data, or any other set of trustlet data described above. However, the set of data can customized based on carrier preferences for establishing digital trust. At step 418, network 404 transmits the data to FEF 406 for analysis. Additionally, network 404 may transmit data about the established service. For example, network 404 can transmit data identifying that the established service is a voice service. Additionally, network 404 may identify the purported identity of UE 402. In some aspects, the data further includes an address corresponding with an entry in a distributed ledger.

In response to receiving the data, FEF 406 loads a configuration for an artificial intelligence module based on the established service, purported identity of the UE 402, or a combination thereof. For example, FEF 406 can search a distributed ledger for an address corresponding to the data provided by network 404 in step 418. The AI filter data stored at the address is loaded by the artificial intelligence module to configure the artificial intelligence module for analysis of UE 402. FEF 406 provides the configured artificial intelligence module with the trustlet data communicated from UE 402. For example, where the artificial intelligence module is an autoencoder, FEF 406 provides the input layer of the autoencoder the trustlet data for UE 402. A reduced dimensionality representation of the trustlet data is generated. FEF 406 compares the reduced dimensionality representation of the trustlet data to the original trustlet data. In some aspects, a reconstruction error score is calculated based on the comparison.

At step 420, FEF 406 communicates an indication to network 404 based on the artificial intelligence module analysis of the trustlet data. For example, where the reconstruction error score does not equal or exceed the predetermined threshold, FEF 406 communicates an indication that UE 402 is trustworthy, in some aspects. Conversely, where the artificial intelligence module generates a reconstruction error score that equals or exceeds a predetermined threshold, FEF 406 communicates an indication that UE 402 is untrustworthy.

Some aspects of call flow 400 includes step 422. At step 422, based on the indication provided by FEF 406, network 404 communicates a signal to UE 408. The signal can be a command for UE 408 to generate a warning that UE 402 is untrustworthy. As such, call flow 400 facilitates detection of anomalous UE activity while a UE is utilizing a service provided by a communication network. The anomalous activity is detected by analyzing data provided by trustlets executed in the TEE of the UE. In response to detecting anomalous activity, the network may warn the other participants (e.g., UE 408) that UE 402 is untrustworthy.

Additionally, or alternatively, based on the indication provided by FEF 406, network 404 can take an access management action to mitigate the risk associated with UE 402. For example, network 404 can terminate access to the network service facilitating the connection between UE 402 and the UE or remote service. For another example, network 404 can restrict access to any other network service currently exposed to UE 402.

Figure 5:
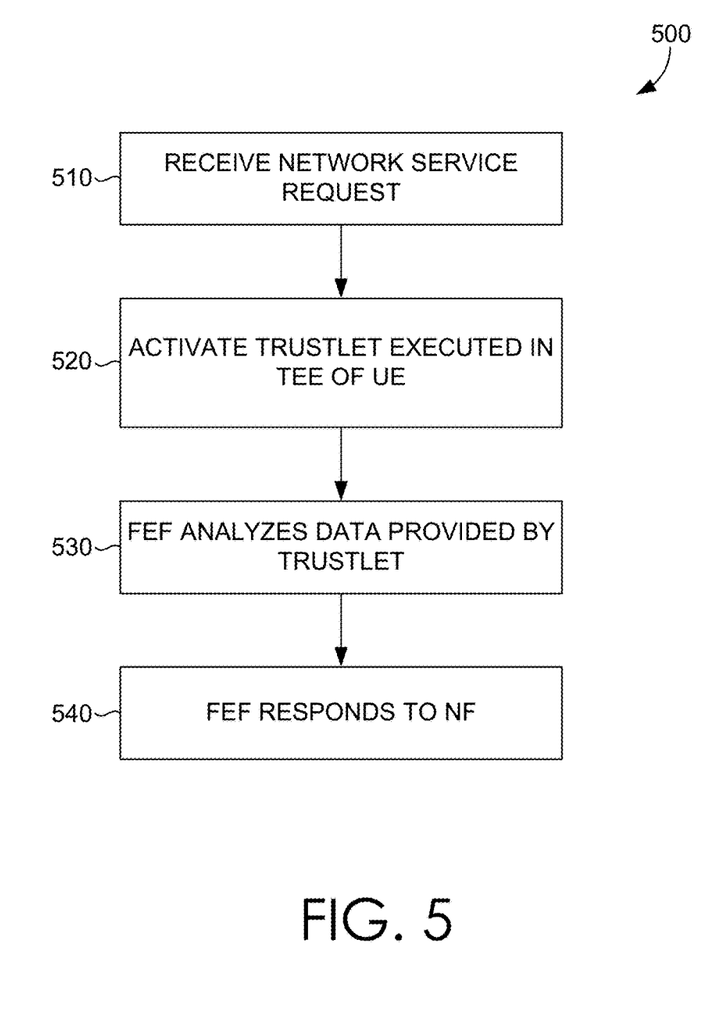
FIG. 5 depicts a method for device filtering based on trustlet data, in accordance with aspects hereof.

Turning to FIG. 5, a method 500 for trustlet-based filtering of requested network services is depicted in accordance described herein. At step 510, a network core function receives an indication that a UE has requested access to a network service, such as any network service described with respect to FIGS. 1-4. The request to access a network service may include a device identifier, application identifier, or any other data that identifies the UE (e.g., a key and value pair). An FEF directly or indirectly receives a device type identifier associated with the UE. For example, as a result of querying a data repository such as the UDR 118 of FIG. 1. Where the network request includes a key and value pair, FEF queries a DLN node for an address corresponding to the key. The value is compared to the data stored in the DLN at the address. In some aspects, where the value matches the data stored in the DLN, FEF determines that the UE is a trusted device. In such a situation, method 500 may proceed to step 540. Additionally, or alternatively, the FEF queries the DLN node for an AI filter stored in the DLN. For example, the FEF can search a UDR for a DLN address associated with a UE device identifier. The FEF loads the AI filter stored at the specified DLN address. By loading the AI filter, the FEF configures one or more artificial intelligence models to analyze trustlet data generated by the UE requesting the service in step 510.

At step 520, the FEF triggers the activation of one or more trustlets within the TEE of the UE. Activation of the one or more trustlets may be facilitated by an NEF. For example, the NEF can expose a network slice to the UE that provides a dedicated communication channel to the one or more trustlets activated by the FEF. In some aspects, the NEF limits expose of the network slice to only the UE's TEE. The trustlets collect data from the UE and the data is communicated to the network for analysis by the FEF. At step 530, the FEF analyzes the data collected by the trustlet. For example, the FEF can provide the data to an input layer of a configured artificial intelligence module. In some aspects, the artificial intelligence module encodes the data into a reduced dimensionality representation of that data. The reduced dimensionality representation of the data is compared to the original data. Anomalous patterns in the data are detected (e.g., by calculating a reconstruction error score).

At a step 540, the FEF responds to the access request, for example via a response to a network function handling the access request, with an access management action described herein. In aspects, the access management action may comprise allowing the UE to access the requested network service. In another aspect, the access management action may comprise preventing, limiting, and/or monitoring the provision of the requested network service, based on the preferences of the network operator, as described in greater detail with respect to FIGS. 1-4.

Turning to FIG. 6, computing device 600 includes bus 610 that directly or indirectly couples the following devices: memory 612, one or more processors 614, one or more presentation components 616, input/output (I/O) ports 618, I/O components 620, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 presents data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, camera, joystick, game pad, satellite dish, scanner, printer, wireless device, etc.

Radio 624 represents a radio that facilitates communication with a wireless telecommunications network. In aspects, the radio 624 utilizes one or more transmitters, receivers, and antennas to communicate with the wireless telecommunications network on a first downlink/uplink channel. Though only one radio is depicted in FIG. 6, it is expressly conceived that the computing device 600 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 624 might additionally or alternatively facilitate other types of wireless communications including Wi-Fi, WiMAX, LTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. One or more non-transitory computer storage media having computer-executable instructions embodied thereon that, when executed by one or more processors, cause the one or more processors to perform a method comprising:
   broadcasting, by a user equipment (UE) to a radio access network (RAN), a request for a network service;
   after broadcasting the request for the network service, receiving a request from the RAN for identity information;
   responsive to receiving the request for identity information, activating a trustlet operating within a trusted execution environment of the UE;
   transmitting, to the RAN, a set of identity information generated by the trustlet;
   accessing the requested network service via a communication session with the RAN, the communication session having access privileges to the network service defined by the RAN based on analysis of at least a portion of the set of identity information transmitted to the RAN.

2. The one or more non-transitory computer storage media of claim 1, wherein the trustlet is activated in response to a request generated by a remote device associated with the network service.

3. The one or more non-transitory computer storage media of claim 1, wherein the trustlet is activated while the remote device has access to the network service.

4. The one or more non-transitory computer storage media of claim 1, wherein the network service includes a voice service that enables bi-directional communication between the device housing the one or more processors and a remote device.

5. The one or more non-transitory computer storage media of claim 1, wherein the activated trustlet is selected from a plurality of trustlets based on the requested network service.

6. The one or more non-transitory computer storage media of claim 1, wherein the activated trustlet accesses at least one of a set digital keys that are encoded directly into a processor or microcontroller during manufacturing of the UE, a certificate of authority, or a unique UE identifier.

7. The one or more non-transitory computer storage media of claim 1, wherein the activated trustlet generates the at least a portion of the set of identity information by monitoring operations of the UE while the trustlet is activated.

8. The one or more non-transitory computer storage media of claim 1, wherein the method further comprises providing the activated trustlet access to a device communicatively coupled to the UE, wherein the activated trustlet generates the at least a portion of the set of identity information based on operations of the device.

9. A method of dynamic remote device authenticity validation comprising:
- establishing a session for a network service with a first user equipment (UE), the session maintained by a radio access network (RAN) controlled by a network core; and
- while the RAN is maintaining the session,
- transmitting a signal to the first UE that triggers activation of a trustlet operating within a trusted execution environment of the first UE,
- receiving a set of UE identity data collected by the trustlet,
- determining, at least partially based on output of an artificial intelligence module's analysis of the UE identity data, a score for the UE, and
- executing for the UE an access management action corresponding to the network service based on the score.

10. The method of claim 9, wherein the artificial intelligence module includes an autoencoder.

11. The method of claim 9, wherein the session is maintained via a first network slice, and wherein collecting the set of UE identity data includes exposing access to a second network slice to the first UE, and wherein the method further comprises receiving the set of UE identity data via the second network slice.

12. The method of claim 11, wherein the network core restricts access to the second network slice to only the trusted execution environment of the first UE.

13. The method of claim 9, wherein the access management action comprises terminating the network service.

14. The method of claim 9, wherein the network service includes communication between the first UE and a second UE, and the access management action comprises communicating a signal to the second UE indicating that the first UE is untrustworthy.

15. The method of claim 14, wherein the network service includes a voice service that enables bi-directional communication between the first UE and the second UE.

16. The method of claim 9, further comprising:
- identifying an artificial intelligence filter stored in a distributed ledger, the artificial intelligence filter identified based on a device identifier corresponding to the UE; and
- configuring the artificial intelligence module based on the filter stored in the distributed ledger.

17. The method of claim 16, wherein the distributed ledger is a private distributed ledger verified by a node controlled by the network core.

18. The method of claim 9, wherein the access management action includes monitoring the first UE's use of the network service.

19. The method of claim 9, wherein triggering a trustlet of the first UE causes the trustlet to monitor processor load of the first UE, access biometric sensor data stored by the first UE, access microprocessor data of the first UE, or monitor actions of an application executed by the first UE.

20. A system comprising:
- one or more processors; and
- one or more non-transitory computer storage media having computer-executable instructions embodied thereon that, when executed by the one or more processors, cause the one or more processors to perform a method including,
- broadcasting a request for a network service to a radio access network (RAN),
- after broadcasting the request for the network service, receiving a request from the RAN for identity information,
- responsive to receiving the request for identity information, activating a trustlet operating within a trusted execution environment of the one or more processors,
- transmitting, to the RAN, a set of identity information generated by the trustlet, and
- accessing the requested network service via a communication session with the RAN, the communication session having access privileges to the network service defined by the RAN based on analysis of at least a portion of the set of identity information transmitted to the RAN.

* * * * *